No. 844,442. PATENTED FEB. 19, 1907.
L. DAVID.
COTTON GIN.
APPLICATION FILED SEPT. 14, 1906.

2 SHEETS—SHEET 1.

WITNESSES:
L. B. Bridges
R. W. Bishop

INVENTOR,
Louis David,
BY Davis & Davis,
Attorneys.

No. 844,442. PATENTED FEB. 19, 1907.
L. DAVID.
COTTON GIN.
APPLICATION FILED SEPT. 14, 1906.

2 SHEETS—SHEET 2.

Witnesses
L. B. Bridges
R. W. Bishop

Inventor
Louis David
By Davis & Davis.
Attorneys

UNITED STATES PATENT OFFICE.

LOUIS DAVID, OF MONTGOMERY, ALABAMA.

COTTON-GIN.

No. 844,442. Specification of Letters Patent. Patented Feb. 19, 1907.

Application filed September 14, 1906. Serial No. 334,652.

*To all whom it may concern:*

Be it known that I, LOUIS DAVID, a citizen of the United States of America, and resident of Montgomery, county of Montgomery, State of Alabama, have invented certain new and useful Improvements in Sawless Cotton-Gins, of which the following is a full and clear specification, reference being had to the accompanying drawings, in which—

Figure 1:
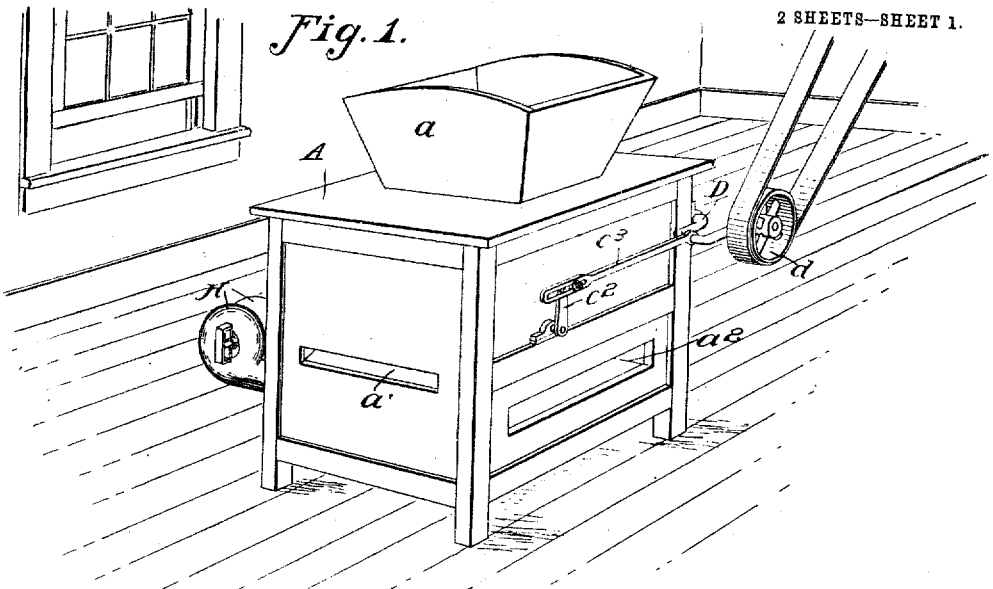
Figure 2:
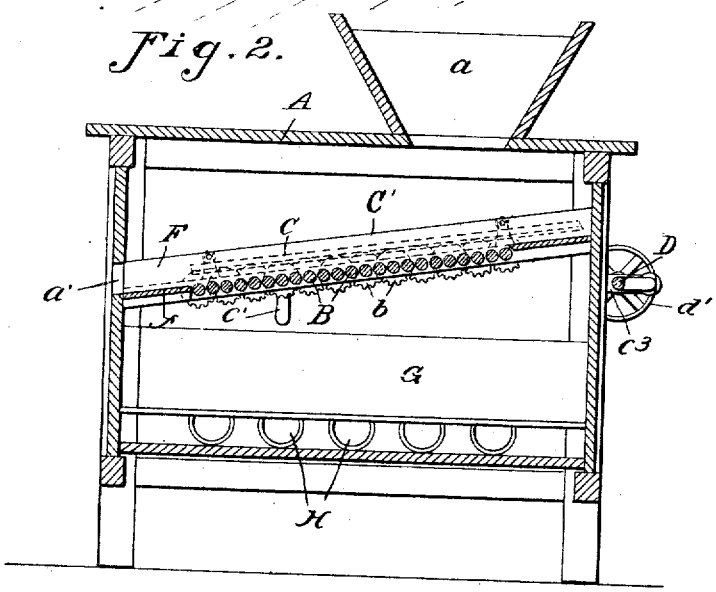
Figure 3:
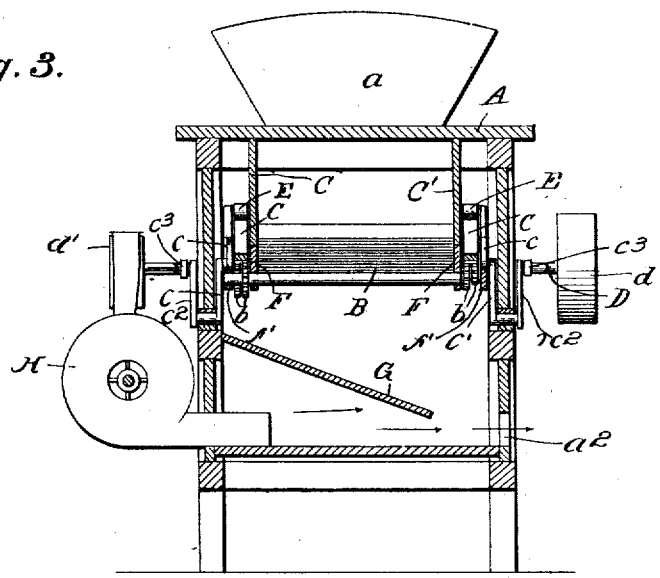
Figure 4:
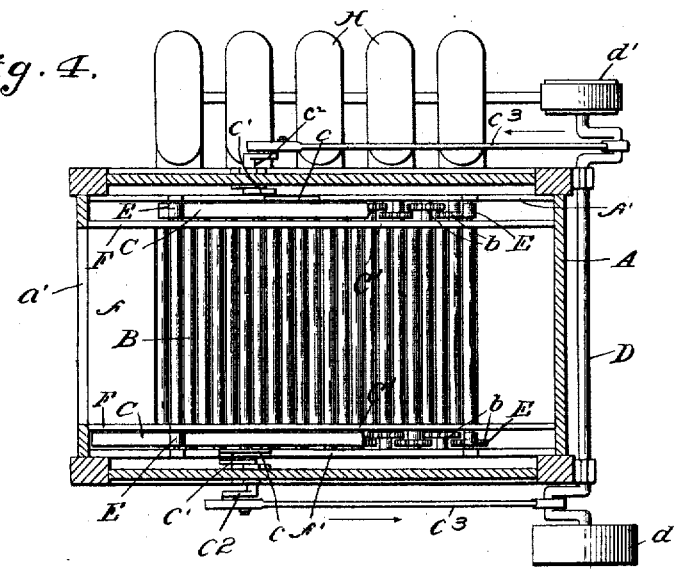

Figure 1 is a perspective view of my improved gin; Fig. 2, a vertical section taken transversely through the ginning-floor; Fig. 3, a vertical section taken at right angles to the section shown in Fig. 2, and Fig. 4 a horizontal section taken through the apparatus at a point above the ginning-floor.

The object of this invention is to provide an extremely simple cotton-ginning apparatus which avoids the necessity of the employment of saws and which provides instead of saws simple means for removing the fiber from the seeds in such manner that it shall not be injured in the least and with as much expedition as is secured with the usual saw devices, as more fully hereinafter set forth.

Referring to the drawings annexed by reference characters, A designates a casing having a hopper $a$ in its top, a seed-discharge slot $a'$ at its rear end, and a discharge-slot $a^2$ at one side for the discharge of the lint-cotton. Across the casing at a suitable point below the top thereof is supported a sort of floor composed of a series of small steel rods or shafts B, arranged closely together and preferably in loose contact with each other. These rods or shafts are rotated by pinions $b$, one of which is affixed to each shaft, and a pair of rack-bars C, provided with teeth on their under sides which engage said pinions.

Each shaft or rod B is provided with one pinion at one end outside of the vertical side boards C' of the ginning-chamber, and these pinions are alternately arranged—that is, the adjacent shafts carry the pinions at opposite ends, so that simultaneous reciprocation of the rack-bar in opposite directions will rotate each pair of adjacent shafts in opposite directions—first in one direction and then, when the rack-bars reverse, in the other direction. In order that the pinions at each side shall not interfere with each other, they are arranged in two rows, and the rack-bar is made wide enough to engage both rows of pinions.

The rack-bars are guided back and forth by suitable rollers E, and they are actuated by a crank-shaft D, driven by a belt-pulley $d$ and having oppositely-arranged cranks, which are connected by a pitman $c^3$ to arms $c^2$ of cranks journaled in the casing, the inner arms $c'$ of these cranks being connected by links $c$ to the respective rack-bars. In this way the rotation of the crank-shaft will simultaneously and alternately reciprocate the rack-bars in opposite directions. The parts may of course be made adjustable to regulate the number of turns of the shafts B each reciprocation of the rack-bars shall accomplish, so that the machine may be adjusted as nearly as possible to the length of staple being ginned.

It will be observed that the rods or shafts form a sort of ginning floor or surface which, when the adjacent pairs of rods are rotated in opposite directions, as described, will serve to pull the fiber away from the seeds, the fiber being drawn down between the rods and the seed being left clean on top of the floor. The floor is preferably inclined slightly downwardly toward the seed-discharge $a$ to facilitate the discharge of the seed. The rods are shown as smooth, but it will be understood that they may be provided with slight spiral ribs or grooves, if desired. It is preferable that the rods shall normally lie loosely in contact and that they shall have sufficient elasticity to spread slightly when the fiber is drawn down between them. Of course the rods should be sufficiently rigid to grasp the staple with a sufficient clamping action to readily pull it off the seeds and without permitting the seeds to follow the staple down between the rods. It will thus be observed that all injury to the fiber is avoided, as likewise is the employment of saws, which not only tear the fiber but require to be frequently gummed or sharpened.

To blow out the lint-cotton, a suitable blowing apparatus is provided. I have shown and I prefer a series of blowers H, arranged to discharge into the casing underneath the deflecting-board G, these blowers being simultaneously driven from a belt-wheel $d'$ on the crank-shaft.

It is believed that the rods should be slightly smaller in diameter than the average-sized seed—that is, about three-sixteenths inch in diameter—in order that the lint shall be taken off close to the seed and leave the seed bare and free to roll down the floor to the seed-discharge. As to the length of rod, it is thought that a length of ten inches will prove the best, in that it will give the necessary rigidity and yet allow the necessary elasticity. It will be observed that while but a small quantity of lint will be pulled down between any pair of rods the product of the entire separating-floor will be considerable. It will be observed also that in addition to spirally grooving or ribbing the rods they may be notched or recessed at intervals to furnish additional spaces between the rods for the passage of small quantities of the lint, and thereby avoid unduly spreading the rods.

I am aware of the patent to Willey, No. 8,907, of April 27, 1852, in which a pair of elastic-faced rollers is employed to feed seed-cotton into a chamber in which a fan-like device rotates, this device carrying alternate brushes of bristles and beaters of leather, the brushes acting first to comb out the cotton, which is held by the rollers, and the leather-beaters serving to knock off the seeds, the cotton-seed thus separated being driven over a screen, which serves to separate the seed from the lint-cotton. My invention is distinguished from this apparatus by the fact that I employ numerous small rods arranged approximately in contact and lying in the same plane, and thus constituting a ginning floor or surface, means being provided to rotate adjacent pairs of the rods or shafts in opposite directions, so that the lint will be separated from the seed in numerous small increments, leaving the seed upon the upper surface of the floor free of lint.

Having thus fully described my invention, what I claim, and desire to secure by Letters Patent, is—

1. In a ginning apparatus, the combination of a series of closely-spaced rods or shafts, and mechanism for rotating adjacent pairs of these rods or shafts alternately in opposite directions, whereby each rod will first coöperate with the rod at one side and then coöperate with the rod at the other side and so on, for the purpose set forth.

2. In a ginning apparatus, a ginning floor or surface consisting of a series of closely-spaced comparatively small flexible rods, and means for alternately rotating each adjacent pair of rods in opposite directions so that each rod will first coöperate with the rod at one side and then with the rod at the other side of it, substantially as set forth.

3. In a ginning apparatus, ginning means consisting of a series of closely-spaced rods, a pinion on one end of each rod, the pinions on each adjacent pair of rods being arranged at opposite ends of the rods and the pinions at each side being arranged in a double row so that adjacent pinions shall be out of line with each other, a rack-bar for each double row of pinions, and means for reciprocating said rack-bar simultaneously in opposite directions.

4. In a ginning apparatus, a casing, a ginning-floor inclining toward a seed-discharge and comprising a plurality of pairs of small rods contacting with each other and having bearings at their opposite ends, means for rotating adjacent pairs of these rods in opposite directions to draw the lint down from the seeds and discharge it into the lint-chamber below, a guard or deflector upon which the lint-cotton falls, and a pneumatic discharging means below this deflector.

5. In a ginning apparatus, ginning means consisting of a floor comprising a plurality of pairs of small elastic rods having their peripheries in contact, and means for rotating the rods, for the purpose set forth.

6. In a ginning apparatus, ginning means consisting of a plurality of pairs of small rods or shafts arranged close together in parallelism and in the same plane, to thus constitute a ginning-floor, and means for rotating adjacent pairs of the rods in opposite directions, for the purpose set forth.

In testimony whereof I hereunto affix my signature, in the presence of two witnesses, this 30th day of August, 1906.

LOUIS DAVID.

Witnesses:
W. H. GARTH,
WILLIS CHANDLER.